(12) United States Patent
Brighton et al.

(10) Patent No.: US 8,770,514 B2
(45) Date of Patent: Jul. 8, 2014

(54) LANDING GEAR

(75) Inventors: Trevor Anthony Brighton, Bristol (GB); Martin John Elms, Bristol (GB); Maxwell William Jones, Bristol (GB)

(73) Assignee: Airbus Operations Limited, Bristol (GB)

( * ) Notice: Subject to any disclaimer, the term of this patent is extended or adjusted under 35 U.S.C. 154(b) by 1466 days.

(21) Appl. No.: 11/421,726

(22) Filed: Jun. 1, 2006

(65) Prior Publication Data
US 2011/0024557 A1    Feb. 3, 2011

(30) Foreign Application Priority Data
Jun. 3, 2005    (GB) .................................. 0511417.8

(51) Int. Cl.
*B64C 25/10*     (2006.01)
*B64C 25/20*     (2006.01)

(52) U.S. Cl.
USPC .............. 244/102 R; 244/102 A; 244/102 SL

(58) Field of Classification Search
USPC ................. 244/100 R, 102 R, 102 A, 102 SL
See application file for complete search history.

(56) References Cited

U.S. PATENT DOCUMENTS

| | | | | |
|---|---|---|---|---|
| 1,737,596 A * | 12/1929 | Lewis | ................. | 244/102 R |
| 2,323,640 A * | 7/1943 | Armstrong | ................. | 244/102 R |
| 2,422,576 A * | 6/1947 | Martin | ................. | 244/102 SL |
| 2,422,577 A * | 6/1947 | Martin | ................. | 244/102 R |
| 2,444,319 A * | 6/1948 | Winter | ................. | 244/102 SL |
| 2,444,932 A * | 7/1948 | Higgins | ................. | 244/102 R |
| 2,461,595 A * | 2/1949 | Foster | ................. | 244/102 R |
| 2,567,114 A * | 9/1951 | Linn | ................. | 244/102 SL |
| 2,661,171 A * | 12/1953 | Allen | ................. | 244/102 SL |
| 2,690,888 A * | 10/1954 | Hawkins, Jr | ................. | 244/102 R |
| 2,752,112 A | 6/1956 | Payne, Jr. | | |
| 3,136,506 A * | 6/1964 | Dowty | ................. | 244/102 R |
| 3,752,421 A | 8/1973 | Harvey et al. | | |
| 4,228,975 A * | 10/1980 | Sealey | ................. | 244/102 R |
| 5,288,037 A * | 2/1994 | Derrien | ................. | 244/102 SL |
| 5,381,986 A * | 1/1995 | Smith et al. | ................. | 244/49 |
| 6,704,625 B2 * | 3/2004 | Albero et al. | ................. | 701/3 |

FOREIGN PATENT DOCUMENTS

GB         485467        5/1938
GB       1175097       12/1969

OTHER PUBLICATIONS

Prior Art Figure A320, Jun. 6, 1989.

* cited by examiner

*Primary Examiner* — Philip John Bonzell
(74) *Attorney, Agent, or Firm* — Lowe Hauptman & Ham, LLP

(57) ABSTRACT

In the retracted position, aircraft landing gear of an aircraft is supported by an uplock hook. The deployment of the aircraft landing gear includes the steps of supporting at least part of the weight of the landing gear by a releasable catch in the form of an uplock hook, applying a lifting force to the landing gear to remove at least part of the load sustained by the releasable catch, releasing the catch and effecting the downward movement of the landing gear to the deployed position.

16 Claims, 5 Drawing Sheets

LANDING GEAR

RELATED APPLICATIONS

The present application is based on, and claims priority from, British Application Number 0511417.8, filed Jun. 3, 2005, the disclosure of which is hereby incorporated by reference herein in its entirety.

BACKGROUND

The present invention relates to aircraft landing gear. In particular, the invention relates to an improved method of deploying aircraft landing gear.

FIG. 1 shows a typical landing gear arrangement of the prior art. The nose landing gear 200 is stowed in a retracted position (shown in broken lines in FIG. 1) where the landing gear is held in position by a releasable catch of an uplock assembly 203. The releasable catch is attached to the aircraft fuselage structure. When the landing gear is to be deployed the releasable catch releases the landing gear so that it can be lowered into position. The weight of the landing gear supported by the catch is significant and the sudden release of this weight by the releasable catch causes shock loading and vibration through the aircraft fuselage structure. This can risk damage to any sensitive equipment situated nearby as the shock and vibration are dissipated throughout the fuselage structure. The shock loading also creates undesirable noise and vibrations for any passengers of the aircraft. Also, the shock loading and vibration may reduce the life of systems or structural components mounted on the landing gear itself, or its associated deployment mechanism.

SUMMARY

The present invention recognises that it is desirable to reduce the amount of shock loading and vibration caused by an aircraft landing gear when it is deployed in order that the risk of any detrimental effect on equipment mounted in the vicinity of the landing gear is reduced. A further reason to reduce the shock loading and vibration caused by the landing gear is that the sensation produced on board the aircraft may be disconcerting for passengers travelling on the aircraft.

It is an aim of the present invention to provide a method of deploying aircraft landing gear in such a way as to reduce the shock loading and vibration normally involved in such a process and/or to provide a landing gear deployment system that mitigates one or more of the above-mentioned disadvantages.

According to the present invention there is provided a method of deploying an aircraft landing gear movable between a stowed position and a deployed position, the method comprising the sequential steps of:

supporting at least part of the weight of the landing gear by means of a releasable catch, applying a lifting force to the landing gear to relieve at least part of the load sustained by the releasable catch, releasing the catch, and effecting downward movement of the landing gear to be deployed.

The above-mentioned method advantageously enables a reduction of the amount of shock loading and vibration that occurs when the landing gear is released due to the reduction in weight being supported by the releasable catch at the time of its release. The likelihood of damage being caused to other parts of the aircraft, or the releasable catch itself is thus reduced. A further possible benefit is that the lowering of the landing gear will be less disconcerting to any passengers aboard the aircraft.

Advantageously, the step of applying the lifting force to the landing gear is effected by an actuator that is used in the step of effecting downward movement of the landing gear to the deployed position. In such a case, the force applied to the landing gear by the actuator during the step of applying the lifting force is preferably reduced to facilitate the downward movement of the landing gear to the deployed position. Preferably, the actuator is arranged to be able to effect movement of the landing gear substantially the entire way from the deployed position to the stowed position. During the step of effecting the downward movement of the landing gear to the deployed position a lowering force may be applied to the landing gear.

The lifting force applied to the landing gear, during landing gear deployment, may be insufficient to move the landing gear upwards. Preferably, there is no such upwards movement during the step of applying a lifting force.

Advantageously, the lifting force applied to the landing gear results from pressure exerted by hydraulic fluid in a hydraulic circuit. For example, the lifting force may be as a result of a difference in the pressures exerted by hydraulic fluid in two lines of a hydraulic circuit. The downward movement of the landing gear to the deployed position is preferably effected by means of movement of hydraulic fluid in a hydraulic circuit. The step of releasing the catch may be effected by means of movement of hydraulic fluid in a hydraulic circuit. The steps of applying a lifting force to the landing gear and of releasing the catch may be performed by means of causing one of two lines of the hydraulic circuit to be a supply line and the other to be a return line.

Preferably, the step of releasing the catch is effected a period of time after the step of applying the lifting force to the landing gear, the period of time between the steps being determined by means of a hydraulic delay valve. It will of course be appreciated that the above mentioned hydraulic circuits may be the same hydraulic circuit or form separate parts of a single larger hydraulic circuit.

Alternatively, or additionally, an electronic control system may be provided for controlling movement of the landing gear. Preferably, the step of releasing the catch is effected a period of time after the step of applying the lifting force to the landing gear, the period of time between the steps being determined by means of the electronic control system.

Alternatively, or additionally, a mechanical control system may be provided for controlling the movement of the landing gear.

The releasable catch may be an uplock hook. The releasable catch may be arranged such that it is unable to be released if the landing gear bay doors are closed.

After the step of effecting downward movement of the landing gear to the deployed position has been completed, a step of securing the landing gear in the deployed position with a further releasable catch may be performed. The further releasable catch may be a downlock.

According to the present invention there is also provided an aircraft landing gear assembly including a landing gear movable between a stowed position and a deployed position, (ii) a releasable catch arranged such that the landing gear, when stowed, is at least partially supported by the releasable catch, and (iii) a control apparatus, wherein the control apparatus is arranged such that, on deployment of the landing gear from the stowed position, the control apparatus causes, prior to the release of the releasable catch, a lifting force to be applied to the landing gear which relieves at least part of the load sustained by the releasable catch.

The landing gear assembly may incorporate any of the features described herein in respect of the method of the present invention. Also the method of the present invention may be performed with the use of a landing gear assembly as described herein.

The present invention also provides a control apparatus for a landing gear assembly, the landing gear assembly including a landing gear moveable between a stowed position and a deployed position, and a releasable catch is arranged such that the landing gear, when stowed, is at least partially supported by the releasable catch, wherein the control apparatus is arranged such that, on deployment of the landing gear from the stowed position, the control apparatus causes, prior to the release of the releasable catch, a lifting force to be applied to the landing gear which relieves at least part of the load sustained by the releasable catch.

The control apparatus may be a hydraulic circuit. Alternatively the control apparatus may be an electronic circuit. Another alternative would be to have a mechanical control apparatus. The control apparatus may incorporate any of the features described herein in respect of the method of the present invention. Also the method of the present invention may be performed with the use of a control apparatus as described herein.

BRIEF DESCRIPTION OF THE DRAWINGS

An embodiment of the present invention will now be described by way of example with reference to the accompanying schematic drawings of which.

DETAILED DESCRIPTION OF THE DRAWINGS

Figure 1:
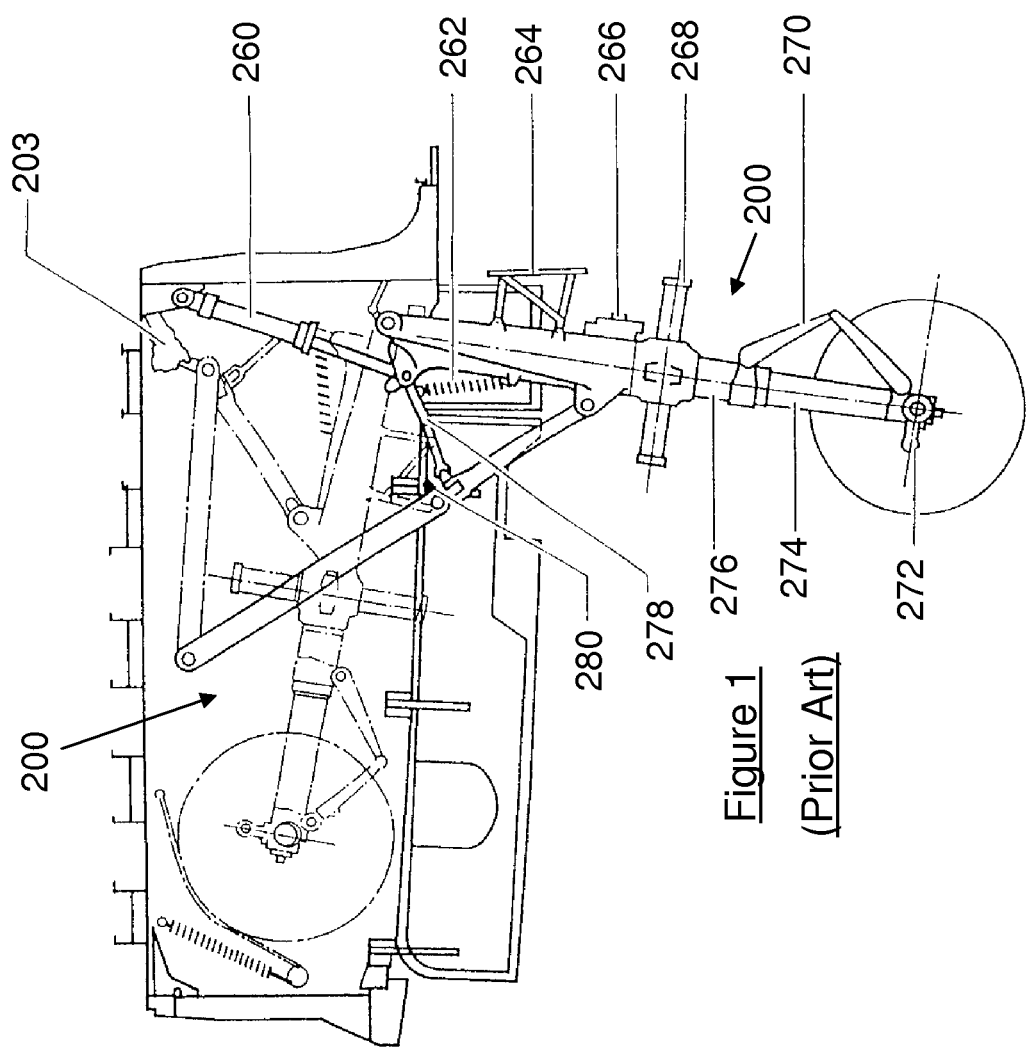
FIG. 1 is a diagram of the prior art.

FIG. 1 shows a typical nose landing gear arrangement of the prior art, the landing gear 200 being shown in the fully extended position by the solid lines, and in the retracted position by the broken lines. The landing gear arrangement includes a nose gear uplock assembly 203, a main actuating cylinder 260, lock springs 262, leg door 264, steering servo control 266, steering actuating cylinder 268, torque link assembly 270, towing fitting 272, shock absorber 274, rotating tube 276, downlock proximity detectors 278, and an uplock roller 280. Knowledge of the detailed operation of those components of the prior art arrangement is not necessary for appreciating the operation of the embodiment of the present invention and so is not described in further detail herein.

Figure 2:
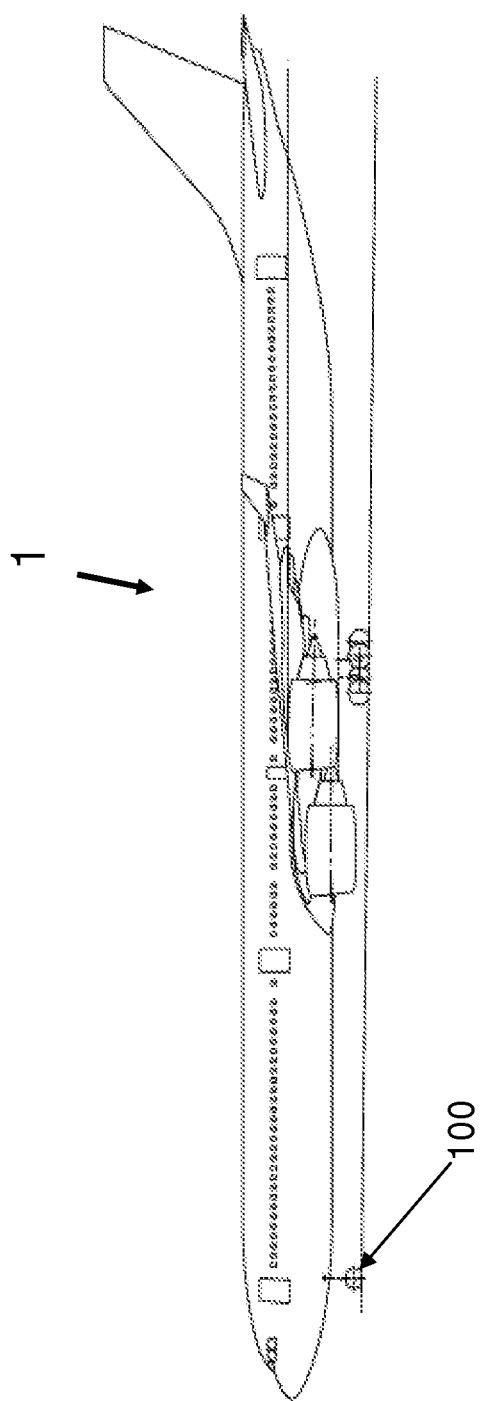
FIG. 2 is a diagram of an aircraft with its nose landing gear deployed.

FIG. 2 shows an aircraft 1 with its landing gear fully deployed. The aircraft includes a nose landing gear 100, the deployment of which being controlled by a hydraulic controlling circuit as will be described in further detail below.

Figure 3:
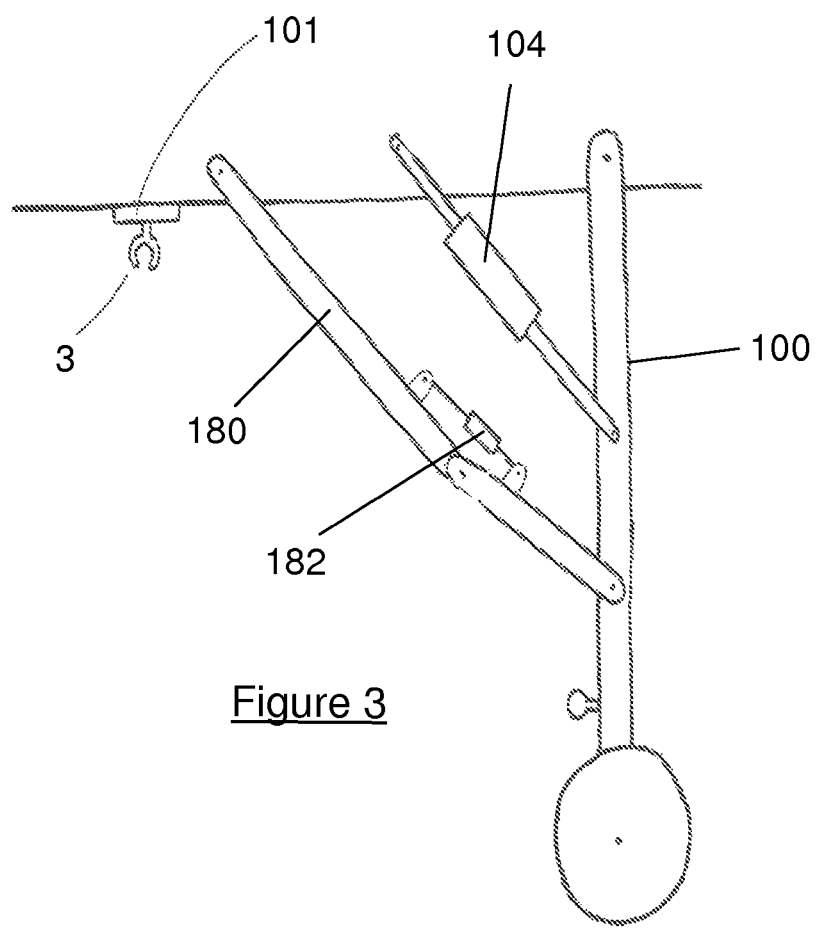
FIG. 3 shows the landing gear in its extended position.

FIG. 3 shows the nose landing gear 100 in the extended position. When in the retracted position the landing gear 100 is supported by a gear uplock hook 3. The uplock hook 3 is mounted to the aircraft structure 101. The landing gear assembly shown in FIG. 3 includes an actuating cylinder 104 for retracting/deploying the nose landing gear, a drag stay 180, and a down-lock/unlock jack 182. The deployment and retraction of the landing gear 100 is effected by means of a hydraulic circuit shown in FIG. 4.

The hydraulic circuit is similar to a conventional hydraulic landing gear deployment circuit, the principle difference being the addition of a delay value which alters the functions of the circuit as described in further detail below.

Figure 4:
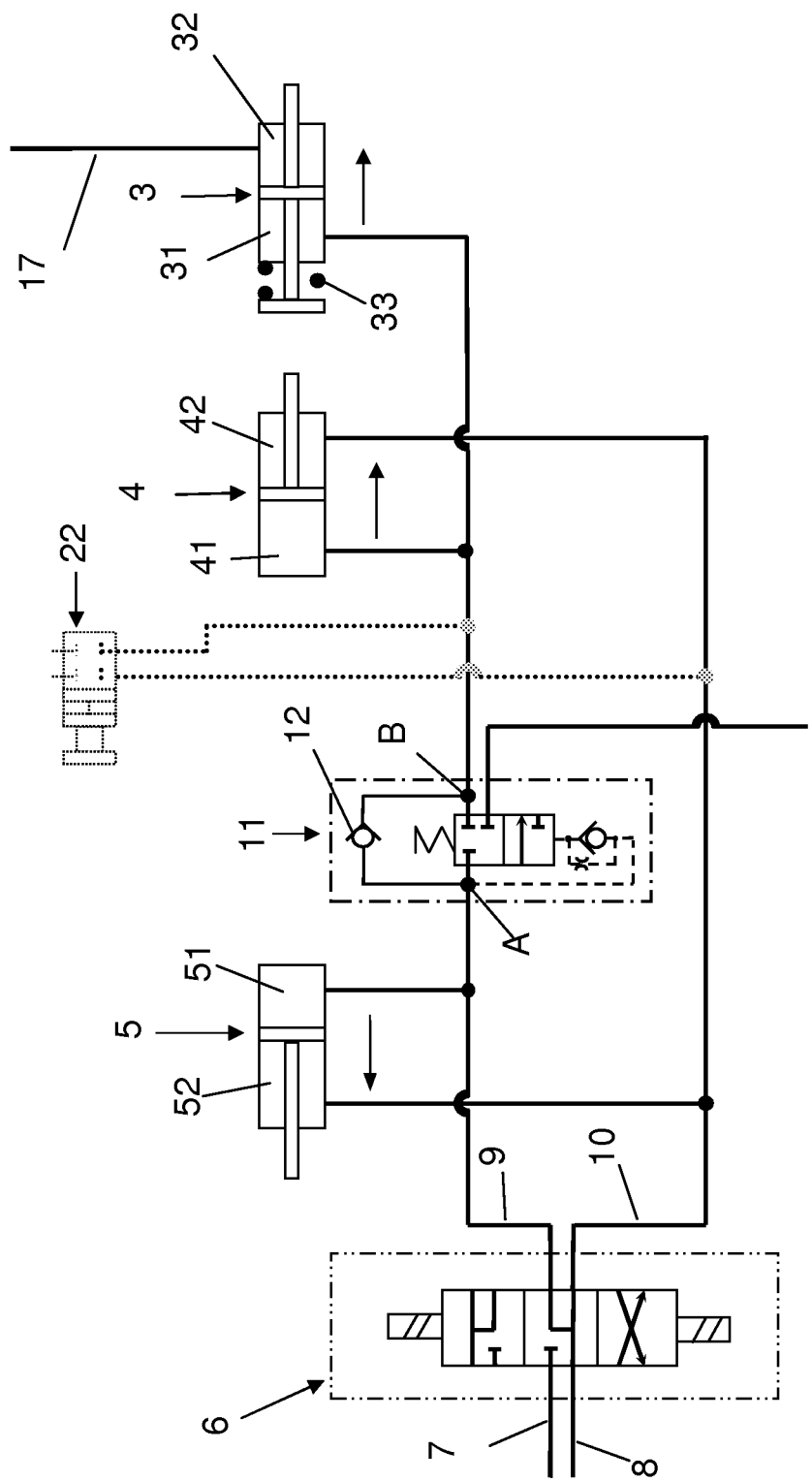
FIG. 4 is a hydraulic circuit diagram including a delay valve for controlling the deployment of the landing gear show in FIG. 3, the circuit being shown when the landing gear is stowed.

The circuit shown in FIG. 4 comprises a gear selector valve 6, a gear downlock 5, a delay valve 11, a gear actuator 4, a gear uplock 3, and a vent valve 22. The circuit further comprises a gear extend line 9 and a gear retract line 10, a supply line 7 and a return line 8 and a doors closed line 17.

The gear selector valve 6 is moveable between three positions, extend, neutral and retract and is shown in the neutral position in FIG. 4. The gear selector valve 6 is shown in the extend position in FIG. 5. The extend position is used to extend the landing gear. The retract position is used to retract the landing gear. When the landing gear is in the retracted position the valve is set to the neutral position. With the valve 6 in the extend position, the supply line 7 is connected to both the gear extend line 9 and gear retract line 10. In the neutral position, the return line 8 is connected to both the gear extend line 9 and gear retract line 10. In the retract position, the supply line 7 is connected to the gear retract line 10 and the return line 8 is connected to the gear extend line 9.

The gear downlock 5 is connected to the gear extend line 9 and gear retract line 10 such that the gear retract line feeds into the piston rod chamber 52 and the gear extend line feeds into opposite chamber 51. The delay valve 11 is situated downstream of the gear downlock 5 on the gear extend line 9. The delay valve 11 is a standard delay valve well known to those skilled in the art. It will be appreciated that the delay valve 11 which bridges points A and B of the circuit acts such that when increased pressure is applied at point A there is a time delay before the valve opens to allow fluid flow between points A and B and for the pressure at point B to equalize. Also when the pressure at point A is reduced so that flow between points A and B drops below a certain level the delay valve acts to block further flow between points A and B The gear retract line 10 also feeds into the piston rod chamber 42 of the gear actuator 4. The gear actuator 4 is further connected to the gear extend line 9, downstream of the delay valve 11 such that the gear extend line 9 feeds into the opposite chamber 41.

The gear uplock 3 is connected to the gear extend line 9 downstream of the delay valve 11 such that the gear extend line 9 feeds into a first chamber 31. The doors closed line 17 is connected to the gear uplock such that 17 feeds into a second opposite chamber 32. Pressure applied to the uplock through the doors closed line 17 acts to close the uplock. The doors closed line 17 provides a safety feature whereby it prevents the release of the landing gear 100 when the landing gear doors are closed. The vent valve 22 is connected to the gear extend line 9 and gear retract line 10 such that it is downstream of the delay valve 11. The vent valve 22 and its connection to the hydraulic circuit are shown in broken lines, as these connections are only utilised if the free fall emergency landing gear deployment system is activated. The vent valve remains closed for normal operation.

Figure 5:
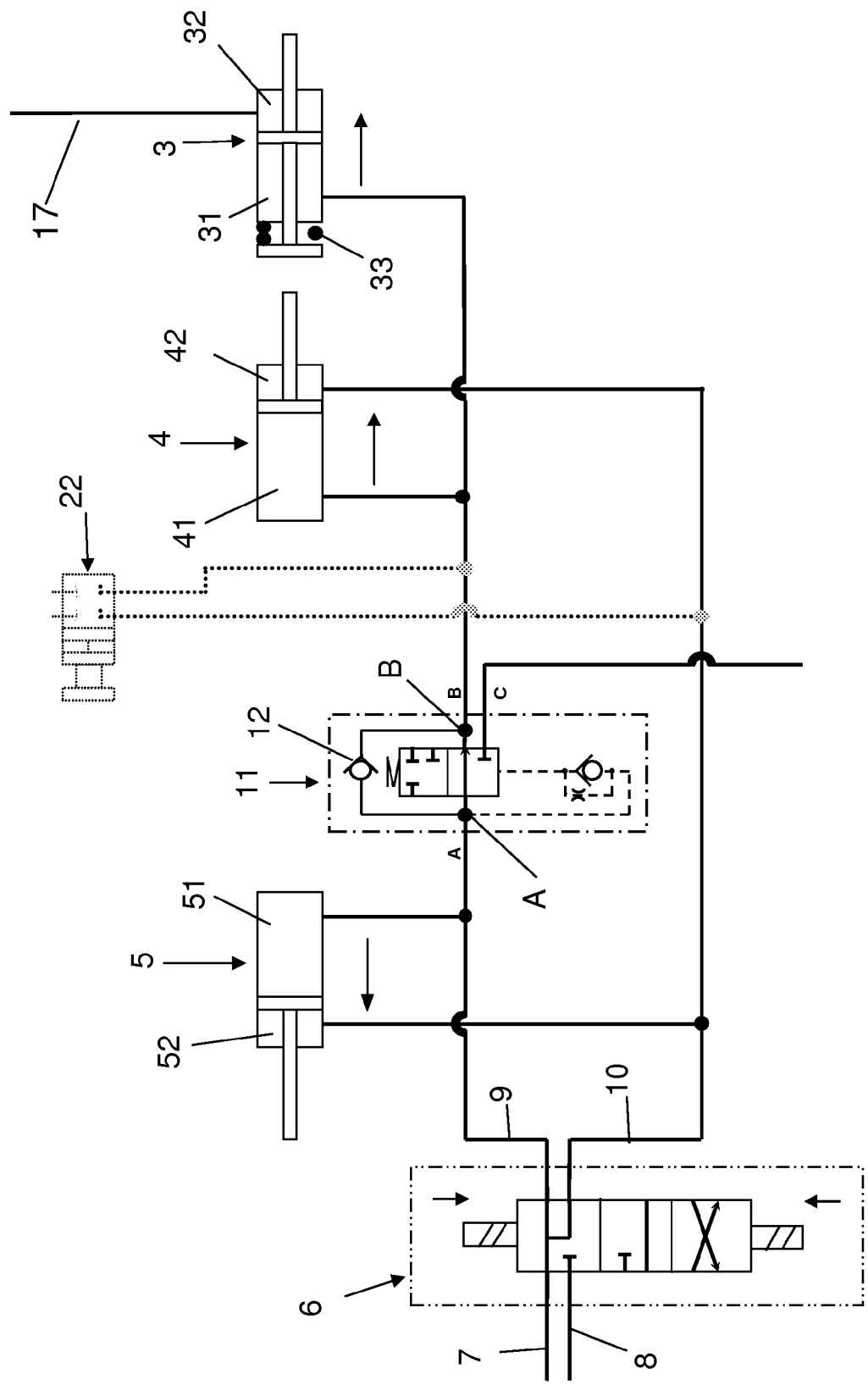
FIG. 5 is the hydraulic circuit diagram shown in FIG. 4, but with the circuit being shown when the landing gear is being deployed.

During the extension of the landing gear 100 the gear selector valve 6 is moved into the extend position (the position shown in FIG. 5). The supply line 7 is then connected to both the gear extend line 9 and the gear retract line 10 and pressure in both the gear extend line 9 and gear retract line 10 increases.

Initially, a significant proportion of the weight of the landing gear 100 is supported by the gear uplock 3, which is in its closed position, and the landing gear bay doors are closed.

The gear retract line 10 is already connected to the gear actuator 4, therefore the pressure increase in chamber 42 is practically immediate. The gear extend line 9 is attached via delay valve 11, therefore the pressure in chamber 41 is initially lower than in chamber 42. The greater pressure in chamber 42 acts to push the piston arrangement such that the gear actuator 4 applies a lifting force to the landing gear 100.

The delay valve 11 also delays the pressure increase in chamber 31 of the gear uplock meaning that the lifting force is supplied to the landing gear while it is still locked in position. Separately, the pressure in the doors closed line 17 reduces as the landing gear bay doors open.

After a predetermined period of time has passed, the delay valve 11 moves into an open position connecting point A on the gear extend line with point B on the extend line (the position shown in FIG. 5). Once the delay valve 11 moves to the open position the initial pressure rise in the extend line 9, raises the pressure in chamber 31 of the gear uplock 3 sufficiently to open the hook against the tension in the spring 33, thus releasing the landing gear (the doors no longer being closed thus preventing the door closed line 17 from locking the gear uplock). The pressure continues to rise in chamber 41 of the gear actuator 4 until it is equal to the pressure in chamber 42. Due to the larger surface area of the piston in chamber 41 the direction of the force applied by the piston rod is then caused to change, such that the lifting force applied to the landing gear 100 changes to a deploying force. As the uplock hook has been released the landing gear starts to move downwards. The gear actuator 4 now causes continued extending and deploying of the landing gear 100 and the hydraulic circuit is in the state as shown in FIG. 5. Once the landing gear has been fully extended, it is locked into position by the gear downlock 5 which is in a locking position as a result of the pressure increase in both the gear extend line 9 and gear retract line 10.

When the landing gear is to be retracted the gear selector valve 6 is moved to the retract position whereby it connects the supply line 7 to the gear retract line 10 and the return line 8 to the gear extend line 9.

The greater pressure in chamber 52 of the gear downlock 5 than in chamber 51 unlocks the landing gear 100 allowing it to be retracted.

The greater pressure in chamber 42 than in chamber 41 of the gear actuator causes the landing gear 100 to retract. Once fully retracted it is secured in position by the gear uplock 3, which is already in a locking position as a result of the lower pressure in chamber 31 of the gear uplock 3 (due to prior application of pressure through the doors closed line 17). It will be appreciated that the delay valve 11 effectively plays no part in the retraction of the nose landing gear 100 as a result of the one-way valve 12 allowing the free flow of hydraulic fluid from point B to point A. Once the landing gear 100 is fully retracted and the uplock hook 3 engaged, the gear selector valve 6 is put into the neutral position.

The tables below show the results of a test conducted to measure the shock loading on the uplock and support structure (mounting plate), in a first case without using the method as described above, and in a second case (shown in bold) using the invention as described. The shock loading was measured when the landing gear is being retracted and goes into uplock, and also when being extended and released out of uplock. The experiment was also repeated with varying loads being applied to the landing gear to model varying flight conditions.

TABLE 1 loads sustained without using method

| | | Into Uplock | | Out of uplock | |
| | Load case | Uplock | Mounting plate | Uplock | Mounting plate |
|---|---|---|---|---|---|
| WITHOUT METHOD | 6F636 No Load 1 | 177 | 15 | 619 | 40 |
| | 6F637 No Load 2 | 163 | 15 | 678 | 53 |
| | 6F638 190 Knots 1.1 G +/− 2° Side slip (1) | 157 | 18 | 754 | 47 |
| | 6F639 190 Knots 1.1 G +/− 2° Side slip (2) | 129 | 20 | 826 | 44 |
| | 6F640 250 Knots 1.1 G +/− 2° Side slip (1) | 148 | 18 | 771 | 45 |
| | 6F641 250 Knots 1.1 G +/− 2° Side slip (2) | 168 | 15 | 787 | 40 |

TABLE 2 loads sustained using embodiment

| | | Into Uplock | | Out of uplock | |
|---|---|---|---|---|---|
| WITH METHOD | 6F642 No Load 1 | 155 | 15 | 185 | 10 |
| | 6F643 No Load 2 | 190 | 15 | 148 | 14 |
| | 6F644 190 Knots 1.1 G +/− 2° Side slip (1) | 187 | 16 | 148 | 15 |
| | 6F645 190 Knots 1.1 G +/− 2° Side slip (2) | 131 | 15 | 174 | 15 |
| | 6F646 250 Knots 1.1 G +/− 2° Side slip (1) | 159 | 13 | 157 | 13 |
| | 6F647 250 Knots 1.1 G +/− 2° Side slip (2) | 185 | 18 | 139 | 13 |

As can be seen the loads sustained by the uplock and mounting plate was not significantly affected by the use of the method when the landing gear was retracted. However, when the landing gear was being extended, and hence released from the uplock, it can be seen that in a variety of conditions, there was a reduction by a factor of four or more in the loads sustained by the uplock and mounting plate when the method of the above-described embodiment was used.

Whilst the present invention has been described and illustrated with reference to a particular embodiment, it will be appreciated by those of ordinary skill in the art that the invention lends itself to many different variations not specifically illustrated herein. For that reason, reference should be made to the claims for determining the true scope of the present invention. By way of example, certain variations to the above-described embodiments will now be described.

The landing gear deployment may be controlled by an electronic circuit rather than a hydraulic circuit. Alternatively, the landing gear deployment may be controlled by a combination of both electronic and hydraulic components, for example with an electronically controlled delay valve inserted in the above-described hydraulic circuit in place of the hydraulic delay valve. A further embodiment could be a fully mechanical control apparatus instead of a hydraulic circuit.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of deploying an aircraft landing gear movable between a stowed position and a deployed position, the method comprising the steps of:
    providing an aircraft including he landing ear assembly including the aircraft landing gear and a deployment mechanism, the deployment mechanism including a releasable catch,
    supporting at least part of the weight of the aircraft landing gear by way of the releasable catch,
    applying a lifting force to the aircraft landing gear to relieve at least part of the load sustained by the releasable catch, and then
    releasing the catch, and
    effecting downward movement of the aircraft landing gear to the deployed position.

2. A method according to claim 1, wherein, during the step of effecting the downward movement of the landing gear to the deployed position, a lowering force is applied to the landing gear.

3. A method according to claim 1, wherein the lifting force applied to the landing gear is insufficient to move the landing gear upwards during landing gear deployment.

4. A method according to claim 1, wherein the releasable catch is an uplock hook.

5. A method according to claim 1, wherein the steps are performed in the recited order.

6. A method according to claim 1, wherein the step of applying the lifting force to the landing gear is effected by an actuator that is used in the step of effecting downward movement of the landing gear to the deployed position.

7. A method according to claim 6, wherein the force applied to the landing gear by the actuator during the step of applying the lifting force is reduced to facilitate the downward movement of the landing gear to the deployed position.

8. A method according to claim 6, wherein the actuator is arranged to effect movement of the landing gear substantially the entire way from the deployed position to the stowed position.

9. A method according to claim 1, wherein the lifting force applied to the landing gear results from pressure exerted by hydraulic fluid in a hydraulic circuit.

10. A method according to claim 9, wherein the downward movement of the landing gear to the deployed position is effected by movement of the hydraulic fluid in the hydraulic circuit.

11. A method according to claim 9, wherein the step of releasing the catch is effected by movement of the hydraulic fluid in the hydraulic circuit.

12. A method according to claim 11, wherein the step of releasing the catch is effected a period of time after the step of applying the lifting force to the landing gear, the period of time between the steps being determined by a hydraulic delay valve.

13. A method according to claim 1, further comprising controlling movement of the landing gear using an electronic control system.

14. A method according to claim 13, wherein the step of releasing the catch is effected a period of time after the step of applying the lifting force to the landing gear, the period of time between the steps being determined by the electronic control system.

15. A method according to claim 1, further comprising, after the step of effecting downward movement of the landing gear to the deployed position has been completed, a step of securing the landing gear in the deployed position with a further releasable catch.

16. A method according to claim 15, wherein the further releasable catch is a downlock.

* * * * *